Patented Feb. 9, 1926.

1,571,938

UNITED STATES PATENT OFFICE.

HARRY R. FULTON AND JOHN J. BOWMAN, OF WASHINGTON, DISTRICT OF COLUMBIA.

PROCESS FOR THE PRESERVATION OF FRESH FRUITS AND VEGETABLES.

No Drawing. Original application filed September 14, 1925, Serial No. 56,415. Divided and this application filed October 3, 1925. Serial No. 60,331.

(GRANTED UNDER THE ACT OF MARCH 3, 1883; 22 STAT. L. 625.).

*To all whom it may concern:*

Be it known that we, HARRY R. FULTON and JOHN J. BOWMAN, citizens of the United States of America, and employees of the United States of America, and employees of the United States Department of Agriculture, residing at Washington, D. C., whose post-office address is care of Department of Agriculture, Washington, D. C., have invented certain new and useful Processes for the Preservation of Fresh Fruits and Vegetables, of which the following is a specification.

This application is a division of our application which bears Serial No. 56,415 and filing date September 14, 1925, on the same subject, and is made under the act of March 3, 1883, chapter 143 (22 Stat. 625) and the invention herein described and claimed may be used by the Government of the United States, and its officers and employees, and by any person in the United States without the payment to us of any royalty thereon. We hereby dedicate the same to the free use of the Government and the people of the United States.

The object of this invention is to prevent the development of decay in citrous and other fruits and vegetables during the process of marketing, especially the prevention of the forms of decay of citrous fruits known as stem-end rot and blue-mold rot.

It has long been known that borax and boric acid have the property of preventing or retarding decay in fresh or raw fruits and vegetables. We have discovered that certain combinations of borax or of boric acid with certain other chemicals that react with the borax or with the boric acid forming new combinations have superior preservative properties. We have found that such preparations are especially effective and useful for the control of various types of decay because of (1) their antiseptic or inhibitory action on the fungi causing the decay; (2) their ability to wet the surface and adhere thereto and penetrate to some extent into the tissues of the fruit where wounded; (3) their non-injurious effect on the fruit itself; and (4) their non-toxic properties in the amounts used for persons consuming the fruit.

The combinations, all in aqueous solution, that have proved to be effective and useful for this purpose are: (a) 5% by weight of borax and 1.39% by weight of anhydrous sodium carbonate; (b) 5% by weight of boric acid and 4.27% by weight of anhydrous sodium carbonate. The above stated proportions are for full strength of the chemicals; the equivalents of these are to be taken in case less than full strength of any ingredient is used in making the solution.

The strengths of solutions indicated are satisfactorily effective, as are also strengths based upon as low as 3% of borax or of boric acid or as high as 8% of borax or of boric acid, with the other ingredients in proper proportions.

Other alkalis, such as sodium hydroxide and sodium bicarbonate, may be used instead of sodium carbonate.

In each of the above stated combinations a chemical reaction takes place by which the borax or the boric acid is practically all changed into combinations of the $Na_2O$ and $B_2O_3$ radicals in proportions different from those in which they exist in borax. For instance, in combinations (a) and (b) stated above the combining proportions and ingredients are such as to produce a ratio of 1 to 1, according to the following chemical equations:

(a) $Na_2B_4O_7.10H_2O + Na_2CO_3 =$
$\qquad 2Na_2O.B_2O_3 + CO_2 + 10H_2O.$ (b) $2H_3BO_3 + Na_2CO_3 =$
$\qquad Na_2O.B_2O_3 + CO_2 + 3H_2O.$ In ordinary borax this ratio is 1 to 2 as is shown by the formula $Na_2O.2B_2O_3$.

The method of treatment as applied to citrus fruits consists essentially in making up any one of the solutions in the proportions indicated and in thoroughly wetting the surface of the fruit with the solution during the process of preparing it for market, the residue of the solution being allowed to dry on the fruit surface and to remain as a protection against subsequent development of decay. The treatment has been found effective at temperatures ranging from about 65° F. to about 120° F. At the higher range of temperature (between 105° F. and 120° F.) effectiveness is increased by soaking the fruit for about five minutes in a bath of the solution. If the treatment is given at lower temperatures, it is sufficient to dip the fruit momentarily in the solution, or to spray the solution over the fruit by some suitable device. After being thoroughly wet with the solution the fruit should be dried in any convenient way, such as may be used ordinarily in citrous packing houses after simple washing of the fruit; and the other processes of brushing and polishing may be followed as is usually the practice with citrous fruits. Similar procedure would be followed with other fruits and vegetables, the object being to apply a thorough surface coating of the solution during the process of preparing the fruit for market, to allow it to dry so as to leave a slight and inconspicuous but effective residue, that will have a preservative effect during a prolonged marketing period.

The specific advance over other methods previously used consists in treating the fresh fruits and vegetables with a solution of borax or boric acid combined with mineral acids or with alkalis in such way as to produce highly effective combinations of $Na_2O$ and $B_2O_3$, namely $Na_2O.B_2O_3$, these being applied in such way as to leave a slight surface deposit that will effectively check the development of rot fungi over an extended marketing period.

We claim:—

1. An improved process for preparing fresh fruits and vegetables for market, which comprises the application to the surface of such articles of an aqueous solution containing the sodium oxide radical and the boric acid radical in equal proportions and of such a strength as to effectively retard the growth and development of the organisms that cause stem-end rot, blue-mold rot, and other forms of decay.

2. An improved process for preparing fresh fruits and vegetables for market which comprises the application to the surface of such articles of a solution containing approximately 5 parts by weight of borax and 1.39 parts by weight of anhydrous sodium carbonate in 100 parts by weight of water, to effectively retard the growth or development of the organisms causing stem-end rot, blue-mold rot, or other forms of decay.

HARRY R. FULTON.
JOHN J. BOWMAN.